(12) United States Patent
Mitchell

(10) Patent No.: US 6,467,811 B2
(45) Date of Patent: Oct. 22, 2002

(54) FLANGED CONNECTION REPAIR DEVICE AND METHOD

(75) Inventor: Jessie Q. Mitchell, Moulton, AL (US)

(73) Assignee: Omega Multi National, Moulton, AL (US)

( * ) Notice: Subject to any disclaimer, the term of this patent is extended or adjusted under 35 U.S.C. 154(b) by 0 days.

(21) Appl. No.: 09/726,904

(22) Filed: Nov. 30, 2000

(65) Prior Publication Data

US 2002/0021004 A1 Feb. 21, 2002

Related U.S. Application Data

(60) Provisional application No. 60/224,142, filed on Aug. 10, 2000.

(51) Int. Cl.⁷ .............................................. F16L 55/00
(52) U.S. Cl. ........................... 285/15; 285/19; 285/39; 285/117; 285/412; 285/368; 285/114
(58) Field of Search .......................... 285/15, 19, 39, 285/117, 412, 368, 114

(56) References Cited

U.S. PATENT DOCUMENTS

| 866,395 | A | | 9/1907 | Skinner | |
|---|---|---|---|---|---|
| 3,152,816 | A | | 10/1964 | Smith | |
| 3,252,192 | A | * | 5/1966 | Smith | 285/114 |
| 4,049,296 | A | | 9/1977 | Harrison | |
| 4,171,142 | A | | 10/1979 | Harrison | |
| 4,230,348 | A | | 10/1980 | Moore | |
| 4,696,453 | A | | 9/1987 | Furuholt et al. | |
| 4,927,181 | A | | 5/1990 | Ciotola | |
| 5,056,830 | A | | 10/1991 | Reaux | |
| 5,161,828 | A | * | 11/1992 | Hynes et al. | 285/114 |
| 5,468,025 | A | * | 11/1995 | Adinolfe et al. | 285/114 |
| 6,056,330 | A | * | 5/2000 | Compton et al. | 285/368 |
| 6,276,729 | B1 | * | 8/2001 | Sanwald et al. | 285/368 |
| 6,315,335 | B1 | * | 11/2001 | Seedorff | 285/412 |

* cited by examiner

Primary Examiner—Lynne H. Browne
Assistant Examiner—Aaron M Dunwoody
(74) Attorney, Agent, or Firm—Lanier Ford Shaver & Payne, P.C.; Gerald M. Walsh

(57) ABSTRACT

The present invention is a flanged connection repair device and method for flanged pipe joints and the like that produces axial compression against the flanges of the joint so that the flange bolts may be removed and replaced, while simultaneously producing radial pressure on the sealant between the flanges, mechanically and radially compressing the sealant into the joint, directing the sealant around the full perimeter of the flanged joint. By providing both axial and/or radial compression the invention stops leaks in the pipe without interrupting the use of the pipe, duct work, and the like, and can be used permanently or temporarily, repeatedly, and under a variety of conditions including moderate to high internal pressures, vacuums, and temperatures.

31 Claims, 5 Drawing Sheets

FLANGED CONNECTION REPAIR DEVICE AND METHOD

CROSS REFERENCES TO RELATED APPLICATIONS

This application claims the benefit of an earlier filed co-pending U.S. Provisional Patent Application Ser. No. 60/224,142, filed Aug. 10, 2000, the disclosure of which is hereby incorporated herein by reference.

FIELD OF THE INVENTION

This invention relates generally to a device and method for repairing flanged connections and, more particularly, to a repair device and method for sealing a leak at flanged pipe connections, valve flanges and the like, and also replacing flange bolts in flanged connections, while the pipeline remains in use.

BACKGROUND OF THE INVENTION

Flanged connections, also known as couplings, are widely used for connecting sections of pipe or ductwork and are often employed for positioning control valves between sections of pipe in a piping network. In many applications, such piping networks serve as conduits for the delivery of fluids under moderate to high pressure. In other applications, such networks operate at pressures lower than the pressure acting upon the exterior of the piping network itself. In either case, the flanged connections are prone to leak. For this reason, among others, various configurations of seals are utilized between the flanges to prevent such leaking. One of the most common configurations includes a raised face on the inner portion of each of the flanges having an annular gasket positioned between the raised faces. When the flanges are bolted together the raised faces compress the gasket material to form a seal.

Leaks often begin in such flange pipe couplings because of deterioration of the gasket material, shifting of the pipe and for other reasons. Similarly, a leak may occur due to defective flange bolts which cause uneven compression on the gasket material. Generally speaking, such leaks must be repaired to prevent damage to the facility housing the piping network, and to maintain proper functioning of the piping system. In the past the pipeline was shut down and drained of its contents before repair could be effected.

Pipe flange repair clamps for sealing the leak between pipe flanges are known in the art. Examples are disclosed in U.S. Pat. Nos. 866,395; 3,152,816; 4,049,296; 4,171,142; 4,230,348; 4,696,453; 4,927,181; and 5,056,830. However, some of the pipe flange repair clamps are extremely complex and have a number of movable and adjustable parts, such as pistons and rings, that make the clamp expensive and difficult to utilize. Moreover, such pipe flange repair clamps normally embody an elastomeric material for centering the clamps around the pipe flanges, and which may provide an initial sealing arrangement between the pipe and clamp. Such elastomeric seals often initially operate properly, but may be adversely affected in certain situations, such as when the leaking fluid is an acid or is at a high temperature and pressure, which can adversely affect the life of the elastomeric material. To solve some of these problems, the elastomeric material can be specially selected, but this still does not solve the compression set properties of the material which often leads to seal failure. Many of the prior art repair devices use sealant injection techniques which can contaminate the process fluid when the injection pressure exceeds the process line pressure.

SUMMARY OF THE INVENTION

One aspect of the present invention is directed to a repair device for a flanged connection where the flanged connection is between a first conduit with a first flange and a second conduit with a second flange, the first and second flanges being connected by bolts. The repair device has first and second transfer flanges, each having a first piece and a second piece. The first and second transfer flanges are connected by two or more tension rods and tension nuts. The first and second pieces of each transfer flange are connected by two or more transfer flange joints for reversible attachment around the conduits. The first and second transfer flanges have one or more ram studs removably attached to the transfer flanges between the transfer flanges and flanges. The first and second transfer flanges are axially compressed towards each other along the conduits by applying torque to the tension nuts on the tension rods, thereby axially compressing the first and second flanges on the conduits towards each other by means of the ram studs.

Another aspect of the present invention relates to a repair device including a slide mounting plate positioned removably between the second transfer flange and the second flange on the conduit by means of the tension rods. The slide mounting plate has two or more projections with compression slide tension bolts and has two or more compression slides, each having a first end and a second end. The first end of the compression slide fits between the flanges on the conduits. The second end is in contact with the compression slide tension bolts. The compression slides are radially compressed between the first and second flanges by applying torque to the compression slide tension bolts, thereby radially compressing a sealant between the flanges.

The present invention overcomes a number of the shortcomings associated with other systems and devices now known in the art. The flange connection repair device may be attached to a leaking pipe connection or other flanged connection of an active pipeline and secured thereto. Axial compression may then be applied to each flange of the flanged connection such that each flange is urged toward the other. Torque is transferred from the flange connection bolts to the repair device tension rods. When properly engaged, the repair device ram studs apply sufficient axial compression to the pipe flanges so that one or more of the pipe flange bolts can be replaced without breaking the pipe connection seal between the flanges. When necessary, all of the flange bolts may be removed without breaking the seal, and therefore, without leakage from the flange connection. A sealing material is preferably deposited along the joint of the leaking flange connection and radially compressed by the compression slides such that the sealing material is forced into the joint. Radial compression is preferably applied along the entire circumference of the joint so that the sealing material is prevented from escaping elsewhere along the joint. Applied radial pressure may then direct the sealant into and around the full perimeter of the flange joint while simultaneously applying axial compression with the transfer flanges and ram studs to the flange connection, thereby providing a method for stopping a leak at the flange joint by applying both axial and radial compression.

As will be described in greater detail below, the invention can be used for repairing flange connections of pipe, ductwork, and the like, which operate at moderate to high internal pressures and vacuums. In addition, all repair work may be performed while the piping remains in use.

The present invention provides a number of advantages over other flanged connection repair devices known in the art. For example, the present invention provides a stable platform for maintaining sufficient compression on the flange joint and sealing gasket during removal of defective flange bolts, such that the flange joint maintains a proper seal. As a result, one or more flange bolts can be removed and replaced while fluid continues to flow through the piping being repaired.

Additionally, the flange connection repair device of the present invention is relatively light in weight, portable, and demountable. As a result, the repair device of the present invention can be quickly and efficiently installed onto a flange connection in need of repair, quickly and easily removed following repair, and thereafter transported to additional flange connections in need of repair. Unlike other devices known in the art, the repair device of the present invention need not remain in place on the defective flange connection. Instead, it can be used to facilitate the replacement of worn parts, and can thereafter be removed from the flange connection for reuse as desired.

The present invention further obviates the use of the encasement method of flange connection repair of leaking flange joints. Such methods typically facilitate the pressurization of large quantities of sealant to force sealing material into the flange joint. Such methods are generally difficult to control and often result in sealant unseating the flange gasket, damaging the flange gasket, and/or bypassing the flange gasket and entering the pipe. In such situations, sealant and/or gasket material is inadvertently introduced into the fluid passing through the piping. Such an occurrence generally contaminates the fluid and may necessitate shutting down the lines so that the contaminates can be purged from the system.

Yet another advantage of the present invention relates to the port hole pattern provided in the transfer flanges. The transfer flanges are provided with pass-through port holes positioned such that they may be aligned with the flange connection bolts. As a result, the flange bolts (studs) may be passed through the transfer flanges during replacement of the flange bolts. This facilitates the removal and replacement of flange bolts in those situations where the pipe flange and transfer flange are in close proximity with each other. Moreover, the present invention provides adjustable depth so that the flange connection repair device can be used in low-clearance piping systems.

Additional features and advantages of the invention will be set forth in the detailed description which follows, and in part will be readily apparent to those skilled in the art from the description or recognized by practicing the invention as described herein.

It is to be understood that both the foregoing general description and the following detailed description are merely exemplary of the invention and are intended to provide an overview or framework for understanding the nature and character of the invention as it is claimed. The accompanying drawings are included to provide further understanding of the invention, illustrate various embodiments of the invention, and together with the description, serve to explain the principles and operation of the invention.

DETAILED DESCRIPTION OF THE INVENTION

Figure 1:
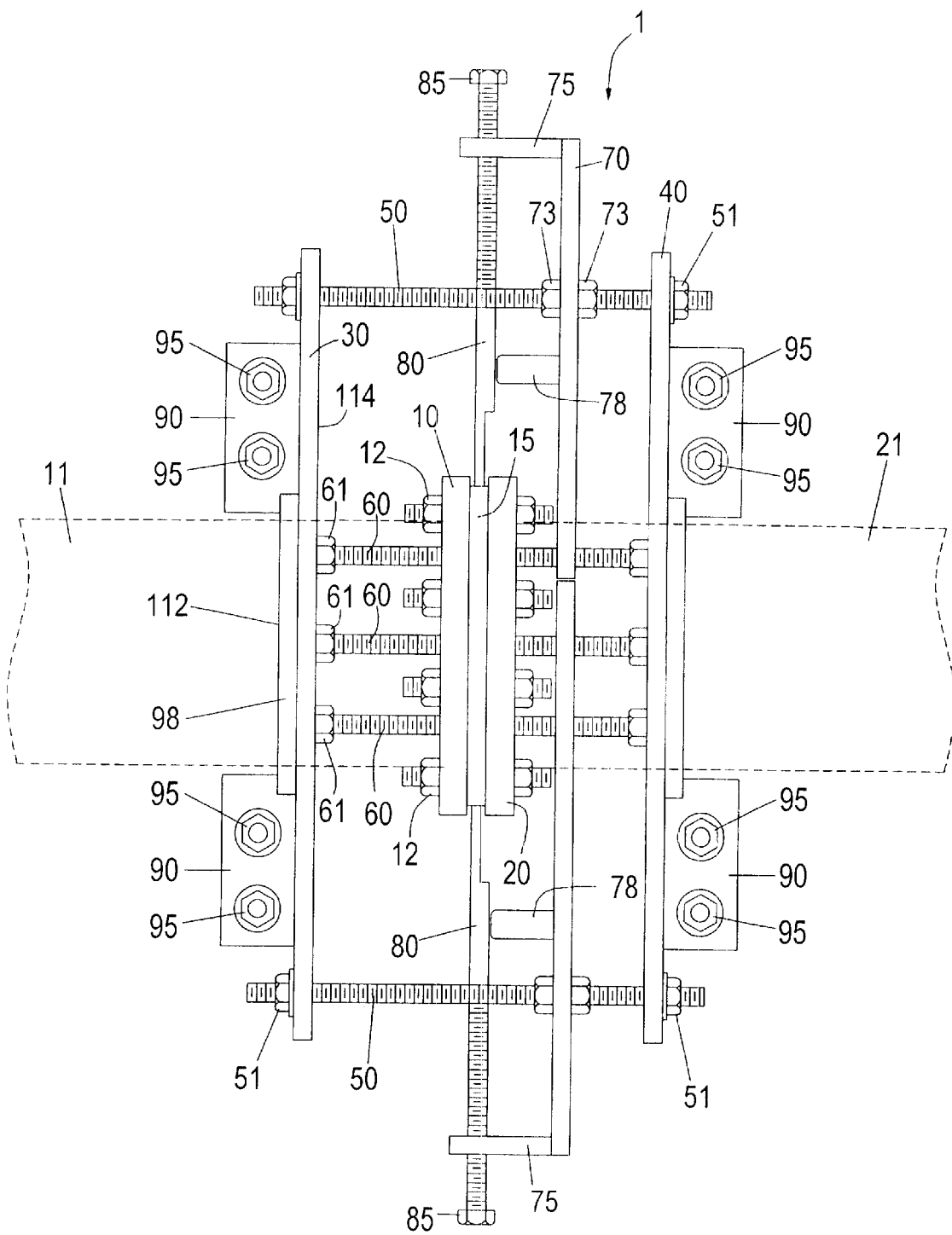
FIG. 1 is a side elevational view of a preferred embodiment of the present invention, including a slide mounting plate and compression slides.

FIG. 1 shows a side elevational view of a preferred first embodiment of the present invention. The flanged connection repair device 1 has a first transfer flange 30 and a second transfer flange 40. Each transfer flange 30, 40 has a first side 112 and a second side 114, and a first piece 110 and a second piece 120 (shown in FIG. 3), with each piece having an annular flange ring 98 connected to a transfer flange joint 90 on a first side 112. Each transfer flange joint has holes to accommodate transfer flange joint nut and bolt assembly 95. Each transfer flange 30, 40 has holes to accommodate at least two threaded tension rods 50, each tension rod 50 having a first end and a second end, and which join transfer flanges 30, 40. Tension rods 50 have tension nuts 51 on the ends of outer first sides 112 to compress transfer flanges 30, 40 towards each other as the tension nuts are threaded and torqued on tension rods 50, from the first and second ends on the outer sides 112. Each transfer flange 30, 40 has ram studs 60 and ram nuts 61 on inner side 114.

First piece 110 and second piece 120 (see FIG. 3) of first transfer flange 30 can be placed around a first conduit 11, and joined by transfer flange joint assembly 90 and nut and bolt assembly 95. Likewise, second transfer flange 40 can be placed around second conduit 21. Conduit 11 has a first flange 10 at its termination and second conduit 21 has a second flange 20 at its termination. Flanges 10, 20 are, thus, positioned between first transfer flange 30 and second transfer flange 40, with at least one ram stud 60 threaded into ram nuts 61 on each transfer flange 30, 40 and making contact with flanges 10, 20. Flanges 10, 20 can be joined with flange bolt/nut assemblies 12 thereby connecting first conduit 11 with second conduit 21, with a seal and sealant 15 positioned in between flanges 10, 20.

A slide mounting plate 70 is positioned between second flange 20 and second transfer flange 40 by means of tension rods 50 through holes in slide mounting plate 70. Slide mounting plate 70 has projections 75 with holes to accommodate threaded compression slide tension bolts 85 which make contact with first ends of at least two compression slides 80. Second ends of compression slides 80 fit between flanges 10, 20. Compression slide tension bolts 85 are torqued to radially advance compression slides 80 towards flanges 10, 20 and sealant 15 thereby mechanically compressing the sealant into the joint or space between the flanges and directing the sealant around the full perimeter of the flanged joint. Slide mounting plate 70 can be advanced towards or away from flange 20 by adjusting slide mounting plate fastening nuts 73 threaded onto tension rods 50. The alignment and positioning of compression slides 80 are facilitated by brace 78 attached to slide mounting plate 70. By providing both axial and/or radial compression the invention stops leaks without interrupting the use of the pipe, duct work, and the like, and can be used permanently or temporarily, repeatedly, and under a variety of conditions including moderate to high internal pressures, vacuums, and temperatures.

Figure 2:
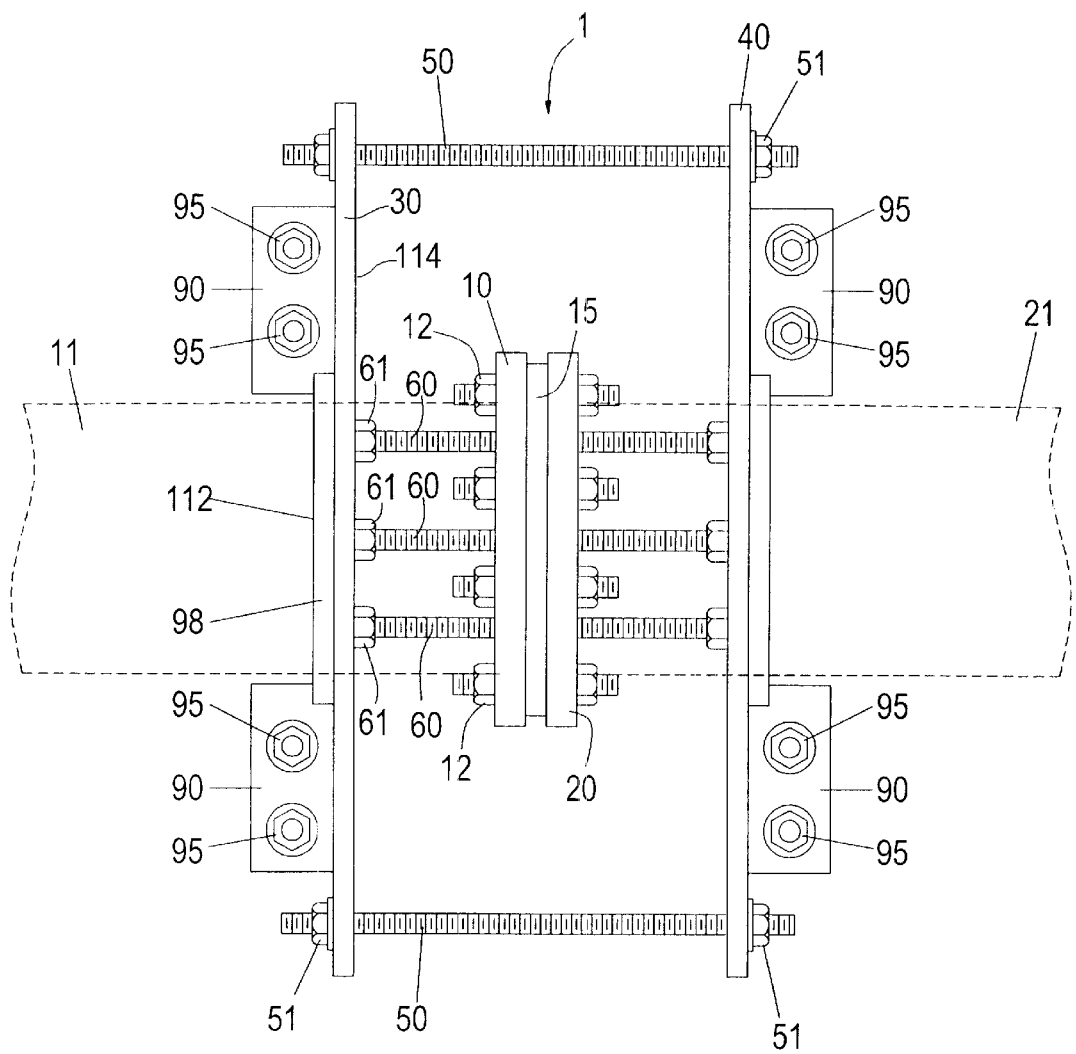
FIG. 2 is similar to FIG. 1 except that the slide mounting plate and compression slides are removed.

A second preferred embodiment of the present invention is the flanged connection repair device 1 of FIG. 1 without slide mounting plate 70 and compression slide 80 assembly, as shown in FIG. 2. The device 1 can be used without slide mounting plate 70 and compression slide 80 to apply axial compression on flanges 10, 20 i.e., by pushing flanges 10, 20 towards each other. In this manner leaking from between flanges 10, 20 can be prevented and nut and bolt assemblies 12 in flanges 10, 20 can be replaced without interrupting use of pipelines 11, 21. Further prevention of leaking is achieved by including slide mounting plate 70 and compression slides 80 in device 1 to produce radial compression of sealant 15.

Figure 3:
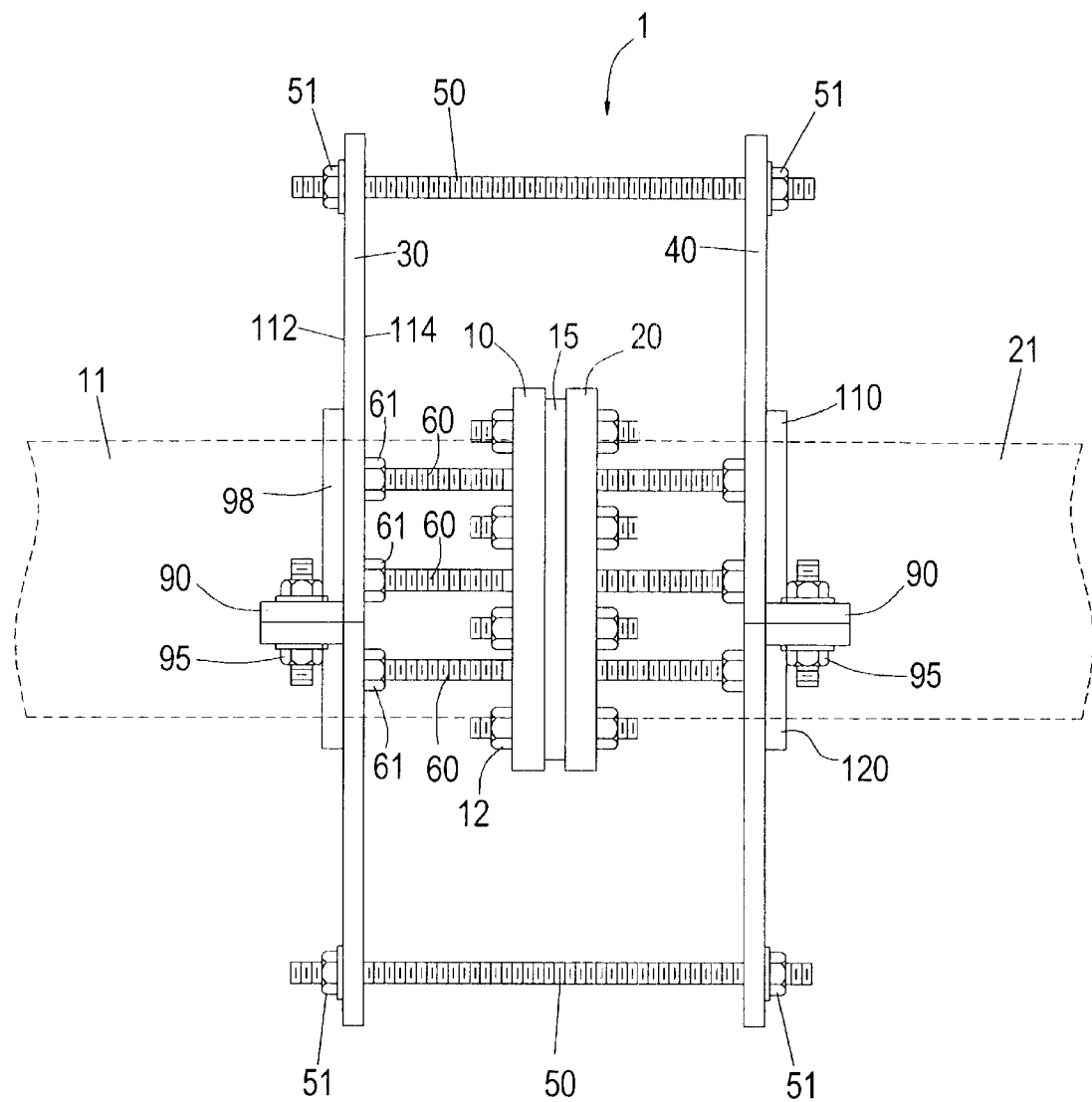
FIG. 3 is similar to FIG. 2 except that the flange connection repair device is rotated about the pipe conduits 90° relative to the position shown in FIG. 2.

FIG. 3 shows the same embodiment of the invention shown in FIG. 2 but rotated 90° relative to the position in FIG. 2. This view illustrates a first piece 110 and a second piece 120. For example, first pieces 110 may be placed above conduits 11, 21 and a second pieces 120 may be placed below conduits 11, 21 and then joined by means of transfer flange joints 90 and secured by transfer flange nut and bolt assemblies 95. The transfer flange joints 90 may be attached or bonded to an annular flange ring 98 which, in turn, is fixed to outer first side 112, thereby providing additional strength to the transfer flange joints 90.

Figure 4:
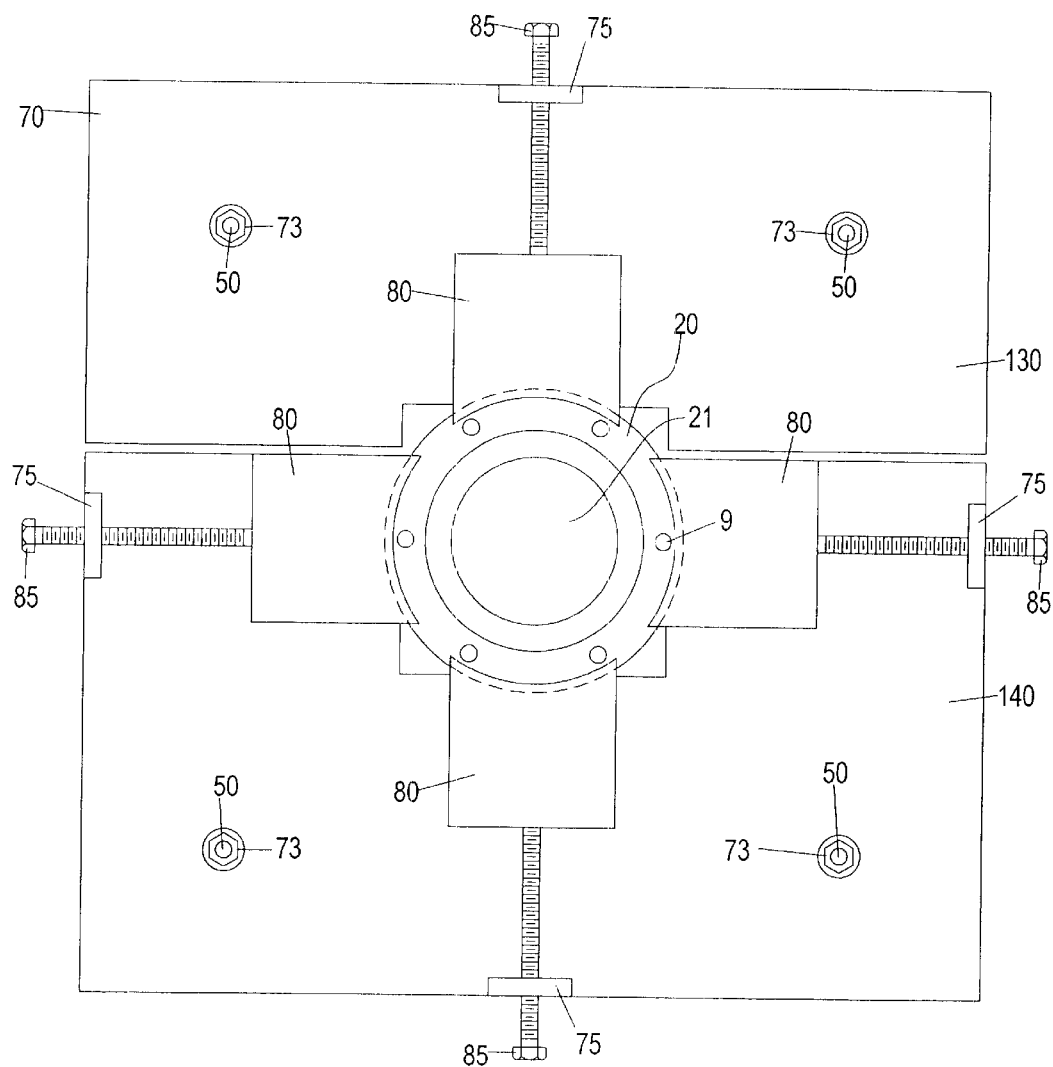
FIG. 4 is a frontal view of slide mounting plate 70, and compression slides 80, viewed from conduit 11 as shown in FIG. 1.

FIG. 4 shows a frontal end view of slide mounting plate 70 and compression slides 80, as viewed from conduit 11 as shown in FIG. 1. First piece 130 may be placed, for example, above second conduit 21 and second piece 140 below second conduit 21, and secured in place by tension rods 50 and slide mounting plate fastening nuts 73. Compression slide tension bolts 85 are used to torque and advance compression slides 80 toward and into the space between flanges 10, 20 thereby radially compressing sealant 15 in between flanges 10, 20. Holes 9 in flange 20 are also shown without bolts and nuts 12.

Figure 5:
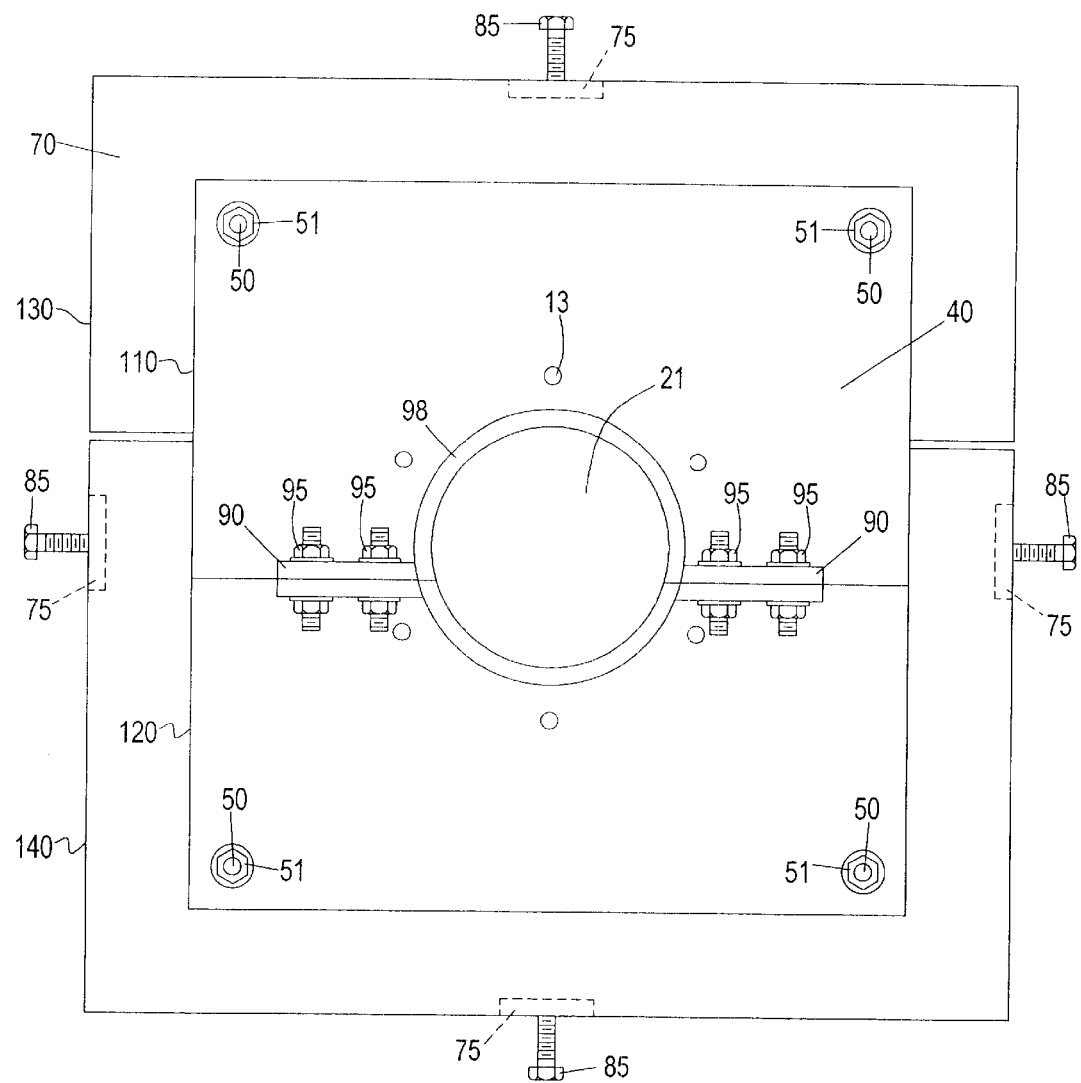
FIG. 5 is a rear view of the flange connection repair device viewed from conduit 21 as shown in FIG. 1.

FIG. 5 shows a rear end view of the flange connection repair device 1, as viewed from conduit 21 as shown in FIG. 1. The figure, thus, illustrates transfer flange 40 in the foreground and slide mounting plate 70 in the background. This view shows first piece 110 of flanged connection repair device above conduit 21 and second piece 120 below conduit 21, secured in place by transfer flange joint 90, attached to flange ring 98, and connecting piece 110 to 120 by means of nut and bolt assembly 95. Likewise, first piece 130 of slide mounting plate 70 is positioned above second conduit 21 and second piece 140 is positioned below second conduit 21, pieces 130 and 140 being held securely in place by attachment to tension rods 50. Access ports 13 are also shown, providing a means to access flange 10, 20 nuts and bolts 12. Transfer flange 30 is constructed identical to transfer flange 40.

The flanged connection repair device may be used, by way of example, as follows. First piece 110 of first transfer flange 30 is placed on the upper portion of first conduit 11, second piece 120 is placed on the lower portion of first conduit 11, and first piece 110 is connected to second piece 112 by joining transfer flange joints 90 with nuts and bolts 95, with inner side 114 facing first flange 10 on first conduit 11. Second transfer flange 40 is applied in a similar manner to second conduit 21. Two. or more tension rods are passed through holes in first transfer flange 30 and tension nuts 51 are attached to first ends of tension rods 50 on outer side 112 of transfer flange 30. Slide mounting plate fastening nuts 73 are threaded onto tension rods 50 starting on the second ends of tension rods 50 and threaded towards inner side 114 of first transfer flange 30 a desired distance. Tension rods 50 are passed through holes in first piece 130 of slide mounting plate 70 with piece 130 above second conduit 21. Likewise, tension rods 50 are passed through holes in second piece 140, with piece 140 below second conduit 21. First and second pieces 130, 140 are advanced towards second flange 20, with brace 78 and projection 75 facing inner side 114 of first transfer flange 30, until first and second pieces 130, 140 of slide mounting plate contact slide mounting plate fastening nuts 73. Additional slide mounting plate fastening nuts 73 are threaded onto tension rods 50 starting on the second end of tension rods 50 and are advanced until they contact slide mounting plate 70. Tension rods 50 are passed through holes in first piece 110 of second transfer flange 40, with piece 110 above second conduit 21. Likewise, tension rods 50 are passed. through holes in second piece 120, with piece 120 below second conduit 21. First and second pieces 110, 120 are advanced towards second flange 20, with inner side 114 of second flange 40 facing inner side 114 of first flange 30. Tension nuts 51 are threaded onto second ends of tension rods 50 from outer side 112 of second flange 40. Ram studs 60 are threaded into ram nuts 61 and adjusted to desired length by an appropriate amount of threading into ram nuts 61. Compression slide tension bolt 85 is threaded into projection 75 on slide mounting plate 70. Compression slides 80 are inserted into the space between flanges 10, 20 so as to make contact with sealant 15 and compression slide tension bolts 85. Tension nuts 51 are torqued as desired so as to axially compress transfer flanges 30, 40 towards each other, thereby applying axial compression on flanges 10, 20 by means of ram studs 60. Compression slide tension bolts 85 are torqued as desired so as to radially move compression slides 80 into the space between flanges 10, 20, thereby applying radial compression on sealant 15. Flange bolts 12 may then be removed and replaced. New sealant may be applied between flanges 10, 20 prior to the application of radial pressure and/or axial pressure.

The above method may be applied without the use of the slide mounting plate 70 and associated compression slides 80 when the application of only axial compression is desired in order, for example, to change out flange bolts 12.

By way of example, the device shown in FIGS. 2 and 3, without the slide mounting plate and compression slides, was tested on a flanged connecting pipe testing apparatus. The device was applied as described above to the flanged connection between two pipes, and the tension nuts were appropriately torqued. The flange bolts were removed from the first and second flanges, the pipe was blind flanged (closed) on one end of the pipe section and the pipe section was filled with water. A hand pump was connected to the pipe section and pressure was applied. The blind flange was temporarily loosened to bleed air from the pipe section. The pipe section was pumped to at least approximately 1200 psig internal water pressure. Pressure was maintained in the pipe section for at least approximately 10 minutes with no visible sign of water leakage from the unbolted flanged connection during the test.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the transfer flanges, the slide mounting plate, and the compression slides may be square, rectangular, round, or a combination thereof. Slide mounting plates may be used between either the first transfer flange and the first flange, or the second transfer flange and the second flange or both simultaneously. Slide mounting plates may be attached permanently to the tension rods. Transfer flange joints may be used with or without attachment to and reinforcement with flange rings. Various kinds of sealants may be used including, for example, solid materials, liquid materials, elastomeric materials, packing braid wrap, and the like, known in the art. The compression slides may be shaped as desired to fit the contour of the junction between the flanges. The components of the present invention may be constructed of various materials including metals or plastics or combinations thereof. The tension rods and ram studs may be of various lengths to accommodate various applications. Any appropriate size and shape of the device can be used for a given type of piping.

It will be understood that various changes in the details, materials, and arrangements of the parts which have been described and illustrated above in order to explain the nature of this invention may be made by those skilled in the art without departing from the principle and scope of the invention as recited in the following claims.

What is claimed:

1. A flanged connection repair device for compressing a flanged connection between a first conduit with a first flange and a second conduit with a second flange, the first and second flanges being connected by bolts, said device comprising:
   a. first and second transfer flanges, each having a first side and a second side and a first piece and a second piece;
   b. said first and second transfer flanges being connected by two or more tension rods and tension nuts;
   c. said first and second pieces being connected by two or more transfer flange joints on said first side for reversible attachment around the conduits;
   d. said first and second transfer flanges having one or more ram studs removably attached on and projecting from said second side between said first and second transfer flanges and the flanges; and
   e. said first and second transfer flanges being axially compressed towards each other along the conduits by torquing said tension nuts on said tension rods, thereby axially compressing first and second flanges on the conduits with said ram studs.

2. The flanged connection repair device according to claim 1 wherein said ram studs are removably attached to said second side by ram nuts fixed to said second side.

3. The flanged connection repair device according to claim 2 wherein the length of said ram studs projecting from said second side is adjusted by threading said ram studs into or out of said ram nuts.

4. The flanged connection repair device according to claim 3 wherein said transfer flange joints are attached to a transfer flange ring on said first side.

5. The flange connection repair device according to claim 4 wherein said ram studs provide sufficient axial compression of the first and second flanges so that use of the conduits is not interrupted when the bolts of the first and second flanges are removed and replaced.

6. The flange connection repair device according to claim 5 wherein said transfer flanges are square, rectangular, round, or a combination thereof.

7. The flange connection repair device according to claim 6 wherein the repair device is constructed of metal, plastic, or a combination thereof.

8. A flanged connection repair device for compressing a flanged connection between a first conduit with a first flange and a second conduit with a second flange, the first and second flanges being connected by bolts, comprising:
   a. first and second transfer flanges, each having a first side and a second side and a first piece and a second piece;
   b. said first and second transfer flanges being connected by two or more tension rods and tension nuts;
   c. said first and second pieces being connected by two or more transfer flange joints on said first side for reversible attachment around the conduits;
   d. said first and second transfer flanges having one or more ram studs removably attached on and projecting from said second side between said transfer flanges and first and second flanges;
   e. said first and second transfer flanges being axially compressed towards each other along the conduits by torquing said tension nuts on said tension rods, thereby axially compressing first and second flanges on the conduits by means of said ram studs;
   f. a slide mounting plate positioned removably between said second transfer flange and the second flange on the second conduit by means of said tension rods, said mounting plate having two or more projections with compression slide tension bolts, and two or more compression slides; and
   g. said compression slides having first and said second ends, said first ends fitting removably between the first and second flanges and said second ends in contact with said compression slide tension bolts, said compression slides being radially compressed between the first and second flanges by torquing said compression slide tension bolts.

9. The flanged connection repair device according to claim 8 wherein said ram studs are removably attached to said second side by ram nuts fixed to said second side.

10. The flanged connection repair device according to claim 9 wherein the length of said ram studs projecting from said second side is adjusted by threading said ram studs into or out of said ram nuts.

11. The flanged connection repair device according to claim 10 wherein said transfer flange joints are attached to a transfer flange ring on said first side.

12. The flange connection repair device according to claim 11 wherein said ram studs provide sufficient axial compression of the first and second flanges so that use of the conduits is not interrupted when the bolts of the first and second flanges are removed and replaced.

13. The flanged connection repair device according to claim 12 wherein said slide mounting plate is positioned adjustably on said tension rods by means of slide mounting plate fastening nuts.

14. The flanged connection repair device according to claim 12 wherein said slide mounting plate is fixed permanently to said tension rods.

15. The flanged connection repair device according to claim 12 wherein said slide mounting plate is positioned between the first transfer flange and first flange.

16. The flanged connection repair device according to claim 12 wherein said slide mounting plates are positioned between the first transfer flange and first flange and between the second transfer flange and second flange.

17. The flanged connection repair device according to claim 13 wherein said compression slides radially compress a sealant between the first and second flanges, said sealant composed of solid materials, liquid materials, elastomeric materials, packing braid wrap, or a combination thereof.

18. The flanged connection repair device according to claim 17 wherein said slide mounting plate has a first piece and a second piece so that said slide mounting plate may be reversibly attached around the conduit.

19. The flanged connection repair device according to claim 18 wherein said transfer flanges, slide mounting plate, and compression slides are square, rectangular, round, or a combination thereof.

20. The flange connection repair device according to claim 19 where in the repair device is constructed of metal, plastic, or a combination thereof.

21. A method for repairing a flanged connection between a first conduit with a first flange and a second conduit with a second flange, the first and second flanges being connected by bolts, comprising the steps of:
   a. placing a first transfer flange on the first conduit and a second transfer flange on the second conduit;
   b. connecting said first and second transfer flanges with two or more tension rods, said tension rods having tension nuts;
   c. placing one or more ram studs between said first transfer flange and the first flange and said second transfer flange and the second flange;
   d. applying torque to said tension nuts to axially compress said first transfer flange towards said second transfer flange, thereby axially compressing the first flange against the second flange by means of said ram studs; and
   e. removing the bolts from the axialy compressed first and second flanged connection and inserting new bolts.

22. The method according to claim 21 further comprising the step of reversibly attaching said first and second transfer flanges to the conduits by two or more transfer flange joints.

23. The method according to claim 22 further comprising the step of reversibly and adjustably attaching ram studs to said first and second transfer flanges by ram nuts.

24. A method for repairing a flanged connection between a first conduit with a first flange and a second conduit with a second flange, the first and second flanges being connected by bolts, comprising the steps of:
   a. placing a first transfer flange on the first conduit and a second transfer flange on the second conduit;
   b. placing a slide mounting plate on the second conduit between the second transfer flange and the second flange, said slide mounting plate having two or more projections with compression slide tension bolts, and two or more compression slides;
   c. connecting said slide mounting plate and said first and second transfer flanges with two or more tension rods, said tension rods having tension nuts;
   d. placing one or more ram studs between said first transfer flange and the first flange and said second transfer flange and the second flange;
   e. applying torque to said tension nuts to axially compress said first transfer flange towards said second transfer flange, thereby axially compressing the first flange against the second flange by means of said ram studs;
   f. removing the bolts from the axially compressed first and second flange connections and inserting new bolts; and
   g. placing two or more compression slides radially between the first and second flanges and radially compressing sealant between the first and second flanges by applying torque to said compression slide tension bolts.

25. The method according to claim 24 further comprising the step of reversibly attaching said first and second transfer flanges to the conduits by two or more transfer flange joints.

26. The method according to claim 25 further comprising the step of reversibly and adjustably attaching ram studs to said transfer flanges by ram nuts.

27. The method according to claim 26 further comprising the step of positioning said slide mounting plate adjustably on said tension rods by means of slide mounting plate fastening nuts.

28. The method according to claim 26 further comprising the step of connecting said slide mounting plate permanently to said tension rods.

29. The method according to claim 27 wherein the step of placing said slide mounting plate includes placing said slide mounting plate either between the fist transfer flange and first flange or between the second transfer flange and second flange.

30. The method according to claim 27 further comprising the step of radially compressing a sealant with compression slides between the first and second flanges, said sealant composed of solid materials, liquid materials, elastomeric materials, packing braid wrap, or a combination thereof.

31. The method according to claim 30 wherein the step of placing said slide mounting plate on said conduit is reversible.

* * * * *